United States Patent
Fernandez et al.

(10) Patent No.: US 6,922,664 B1
(45) Date of Patent: Jul. 26, 2005

(54) METHOD AND APPARATUS FOR MULTI-SENSOR PROCESSING

(75) Inventors: Dennis S. Fernandez, Atherton, CA (US); Irene Y. Hu, Belmont, CA (US)

(73) Assignee: Dennis Sunga Fernandez, Atherton, CA (US)

(*) Notice: Subject to any disclaimer, the term of this patent is extended or adjusted under 35 U.S.C. 154(b) by 66 days.

(21) Appl. No.: 09/949,257

(22) Filed: Sep. 7, 2001

Related U.S. Application Data

(62) Division of application No. 09/220,784, filed on Dec. 23, 1998.

(51) Int. Cl.$^7$ ................................................. G06G 7/62
(52) U.S. Cl. ............................... 703/13; 703/1; 703/2; 703/22; 700/2; 700/67; 700/75; 702/19; 702/189; 709/204; 709/217; 709/223; 709/224
(58) Field of Search ................................ 703/22, 1, 13; 700/2, 67, 75; 709/217, 223, 224, 204; 702/19, 189

(56) References Cited

U.S. PATENT DOCUMENTS

| | | | |
|---|---|---|---|
| 4,009,525 A | | 3/1977 | Hollander |
| 4,489,387 A | * | 12/1984 | Lamb et al. ................. 709/237 |
| 5,006,987 A | | 4/1991 | Harless |
| 5,541,982 A | * | 7/1996 | Bergler ..................... 379/93.06 |
| 5,590,062 A | | 12/1996 | Nagamitsu et al. |
| 5,662,523 A | | 9/1997 | Yasumaru et al. |
| 5,696,503 A | * | 12/1997 | Nasburg ..................... 340/933 |
| 5,736,982 A | | 4/1998 | Suzuki et al. |
| 5,739,811 A | | 4/1998 | Rosenberg et al. |
| 5,785,630 A | | 7/1998 | Bobick et al. |
| 5,798,798 A | * | 8/1998 | Rector et al. ................ 348/476 |
| 5,822,544 A | | 10/1998 | Chaco et al. |
| 5,991,431 A | * | 11/1999 | Borza et al. ................. 382/127 |
| 6,055,506 A | * | 4/2000 | Frasca, Jr. ..................... 705/3 |
| 6,249,809 B1 | * | 6/2001 | Bro ............................ 709/217 |
| 6,384,862 B1 | * | 5/2002 | Brusewitz et al. ....... 348/211.99 |
| 6,402,689 B1 | * | 6/2002 | Scarantino et al. .......... 600/300 |

OTHER PUBLICATIONS

Lehr, "DNA's lasting imprint", IEEE Potentials, vol. 8, Issue 4, Dec. 1989, pp. 6–8.*

Chen, et al., "A Mixed–Mode Smart Transducer Interface for Sensors and Actuators," Sound and Vibrational, Apr. 1998, Instrumental Reference Issue, pp. 2–5.

Lee, et al., "Choosing Designs of Calibration Transducer Electronic Data Sheets," Sep. 1998, Hewlett–Packard Company, pp. 1–8.

(Continued)

Primary Examiner—Thai Phan
Assistant Examiner—Herng-der Day
(74) Attorney, Agent, or Firm—Fernandez & Associates LLP

(57) ABSTRACT

Multi-sensor system for real-time embedded monitoring of object senses mixed-mode object conditions. Various sensors separately provide disparate analog signals representing different measurable attributes regarding sensed object. For example, such sensors may separately sense temperature, pressure, or other biometric value. Then, according to specified rule set or other qualifying parameters, a digital signal is generated by a processor or controller to indicate one or more condition of the sensed object according to certain sensor input values. Additionally, such multi-sensor scheme may be coupled to a digital network or otherwise coupled thereto for simulation and/or communication applications.

24 Claims, 5 Drawing Sheets

OTHER PUBLICATIONS

Young, J.S. "Architecture of Smart, Distributed Sensor Systems," Jan. 10, 1996, 5 pgs., http://www.cad.eecs.berkeley.edu/homepage/jimy/research/sensors/ARPAsummary.html.

Datasheet: "Cognisense sensor Interface Circuit EDM710", 1 page, EDC, Columbia, MD, Jun. 29, 1998.

Datasheet: "EDC Cognisense RS-485 Network Node EDC 1451.2-MA," 2 pgs., EDC, Columbia, MD, Oct. 2, 1998.

Datasheet: "Cognisense Smart Sensor Module EDI520" 3 pgs., EDC Columbia, MD, Jun. 29, 1998.

Costlow, T., "Smart Sensor Standard looks for Takeoff," EETimes, Oct. 8, 1998, 4 pgs, htp://www.eet.com/story/OEG199810085014.

Johnson, R., "Proposed IEEE P1451 Architecture–Partitioning and Nomenclature for the P1451.3 and P1451.4 Extensions to the Standard," 8 pgs., Jun. 19, 1997.

Johnson, R., Proposed IEEE P1451 Architecture–Combined P1451.3 and P145.4 Working Groups Meeting, Jun. 23, 1997, EDC, 11 pgs.

Warrior, J., "Smart Sensor Networks for the Future," 9 pgs., 1997, http://www.sensormag.com/net_mar.html.

Press Release: Tactile Sensation Shakes Audio Sound Field: New Sensory Gaming Experience–'Intensor'–Elevates Video Gaming to High Levels, 3 pgs., May 28, 1998, BSG Labs.

* cited by examiner

METHOD AND APPARATUS FOR MULTI-SENSOR PROCESSING

RELATED U.S. APPLICATION DATA

This Application is a divisional of U.S. patent application Ser. No. 09/220,784, entitled "METHOD AND APPARATUS FOR MULTI-SENSOR PROCESSING" by FERNANDEZ, et al., filed Dec. 23, 1998.

FIELD OF INVENTION

Invention relates to electronic sensors, particularly to distributed sensor arrays for processing mixed-mode conditions.

BACKGROUND OF INVENTION

Conventional electronic sensors are used in various industrial and commercial applications, for example, whereby certain transducer-type device may measure a physical condition and generate an electrical signal which represents such measured condition. Conventional sensors, however, typically generate analog signals and are not designed to interface easily to digital networks. Although more recently, electronic industry attention has increasingly turned toward coupling so-called embedded processing elements to digital networks, such recent approaches provide limited capability in processing multi-sensor systems, particularly for digital networks.

SUMMARY OF INVENTION

Invention resides in multi-sensor system and method to enable interactive sensing of mix-signal attributes to determine object condition. Sensors separately measure different physical attributes to generate corresponding analog signals. Then, according to specified rule set or other qualifying parameters, a digital signal is generated by a processor or controller to represent one or more condition of the sensed object according to such sensor signals. Multi-sensor scheme may be coupled to a digital network or electronic facility for simulation and/or communication.

DETAILED DESCRIPTION OF PREFERRED EMBODIMENT

Figure 1:
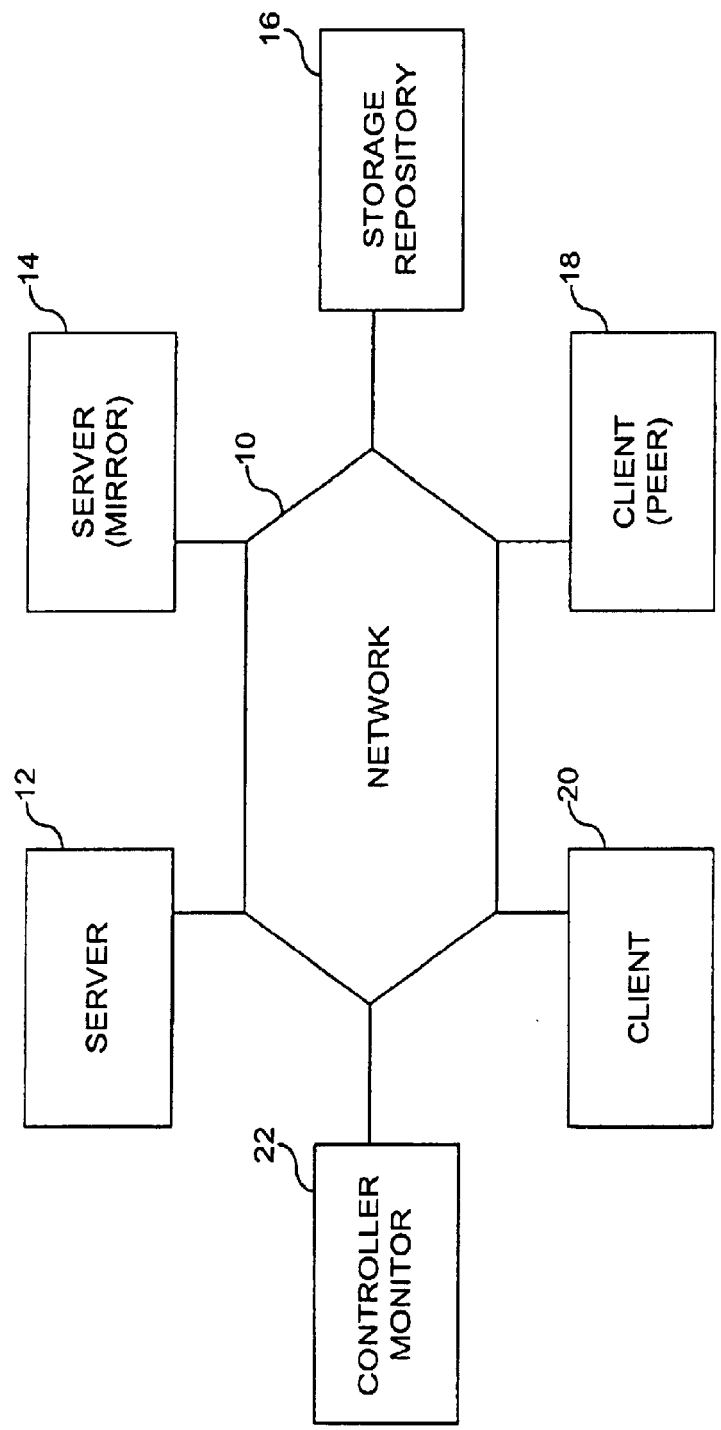
FIG. 1 is general system or network diagram for implementing present invention.

FIG. 1 general diagram shows digital system having interconnected network 10 for coupling servers 12, 14, clients 18, 20, storage repository 16, and controller 22. Network 10 may include one or more local, medium or wide area interconnection or other digital wired or wireless linkage accessible according to one or more standard networking protocol, such as the Internet World-Wide Web, TCP/IP, or other Internet Protocol (IP) convention. Clients 18, 20, servers 12, 14, controller 22, and storage 16 may include one or more network-accessible computer, processor, controller or other system node for processing and/or storing digital data.

Preferably, server 14 serves as fault-tolerant functional mirror or data replication facility for server 12, such that servers 12, 14 are managed to store same data. Also, client 18 serves as peer of client 20, such that client-to-client communication may be accomplished for direct data or signal transfer therebetween. Additionally, storage repository 16 serves as one or more network-accessible peripheral storage or memory facility for storing digital data, such as temporary caching of simulation or communications data or control files or signals.

Controller or monitor 22 serves as one or more network-accessible computing or processing facility for enabling sensing and related functions or other network system management tasks, as described herein. For example, controller 22 may serve as system manager for initiating, coordinating, or otherwise controlling network tasks or other client-server distributed applications, such as video-conferencing or simulation programs executed among a number of client users coupled to the network.

Figure 2:
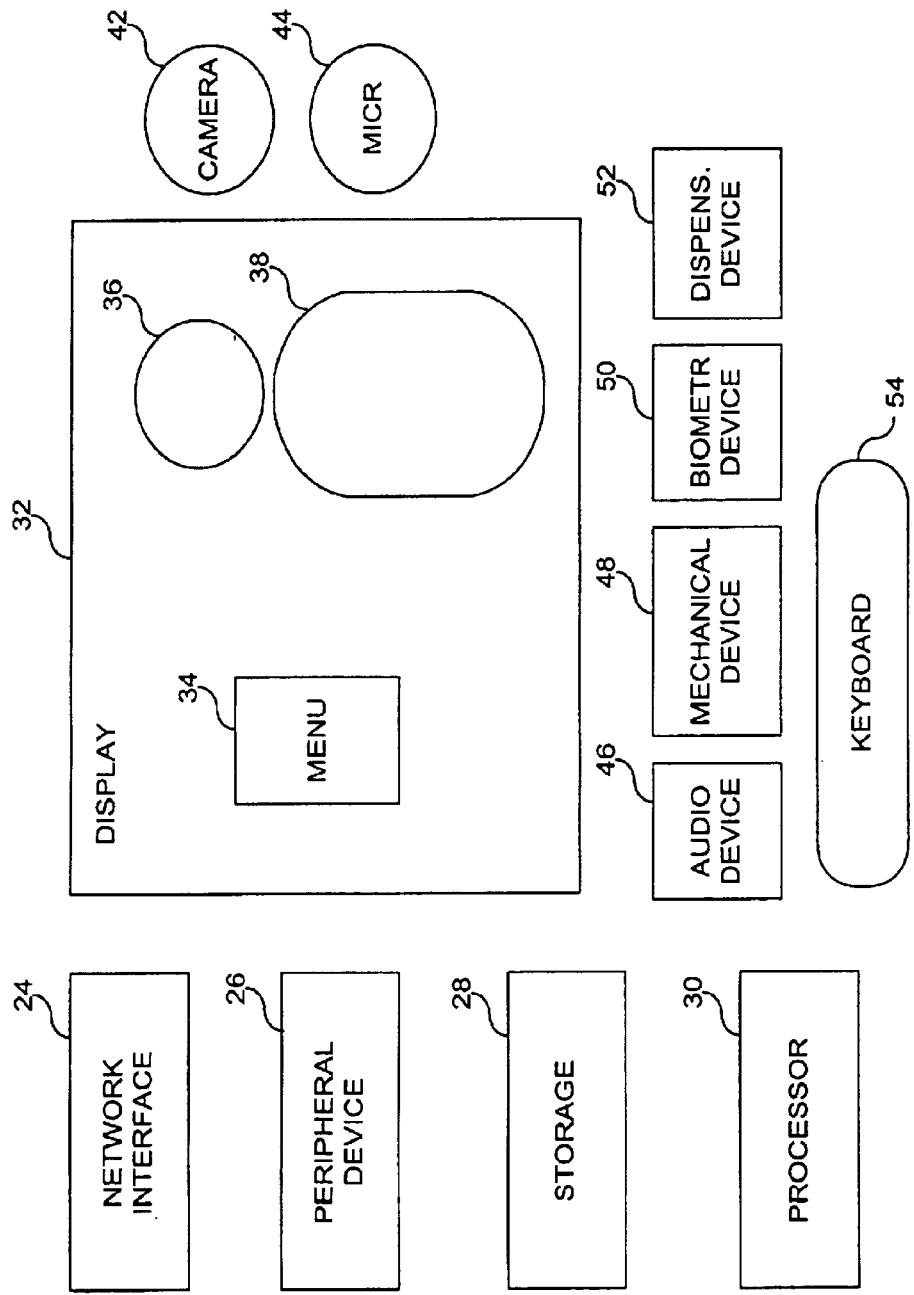
FIG. 2 is block diagram of client for implementing present invention.

FIG. 2 block diagram shows client 20 preferred configuration, including video or screen display 32, network interface 24, peripheral device 26, storage or memory 28, processor 30, speaker or audio device 46, actuator or mechanical device 48, sensor or biometric device 50, dispenser device 52, keyboard or mouse device 54, camera 42, and microphone 44. As shown, display 32 may include one or more graphics-based user menu interface 34 and one or more symbolic, simulated, video, animated, or otherwise graphics-based depiction of individual or object 38 having identifiable face 36, icon, avatar, or other representation thereof.

Display 32 may provide visual information according to holographic, 3-dimensional, virtual reality, or other similarly enhanced graphic dimensional effect. Similarly, speaker or audio device 46 may provide multi-channel or other enhanced stereoscopic or "surround-sound" effect. Additionally, mechanical device 48 may operate as micro or miniaturized actuator, robotic link, vibrator, or other movable element. Dispenser device 52 may electro-mechanically provide client user with requested, programmed, or otherwise computer-assisted packaged goods, medicine, liquids, solutions, consumable items, or other dispensable material.

Preferably, dispenser device 52 may indicate to server 12, 14 or other network node current condition related to dispensing material, such as remaining amount. Optionally, one or more sensors may be implemented on keyboard 54 or mouse device, such that user finger or hand condition sensing is facilitated.

It is contemplated herein that client 20 may be configured, at least in part, by assembling conventional personal computer, TV set-top device, laptop, palmtop, engineering workstation, computer-implemented automated transaction booth or "kiosk", or other network-accessible processing node, which is programmed and equipped to function according to present invention as described herein. In one embodiment of the present invention, it is further contemplated that biometric device or sensor array module 50 may couple directly to network 10, without being included in, or having to couple through, client 20.

Figure 3:
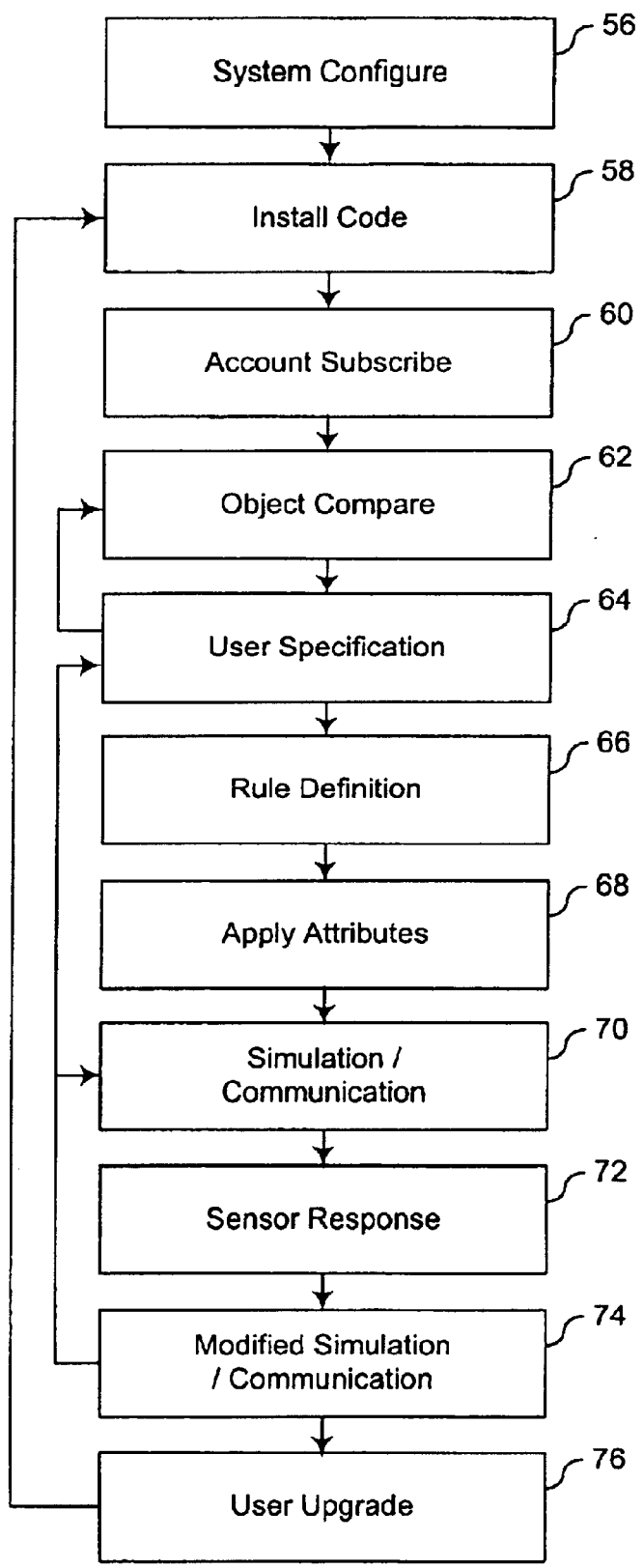
FIG. 3 is flow chart of operational steps for implementing present invention.

In accordance with certain aspects of present invention, FIG. 3 flow chart shows operational steps for implementing multi-sensor system for real-time embedded monitoring of one or more objects under mixed-mode sensing conditions.

Figure 4:
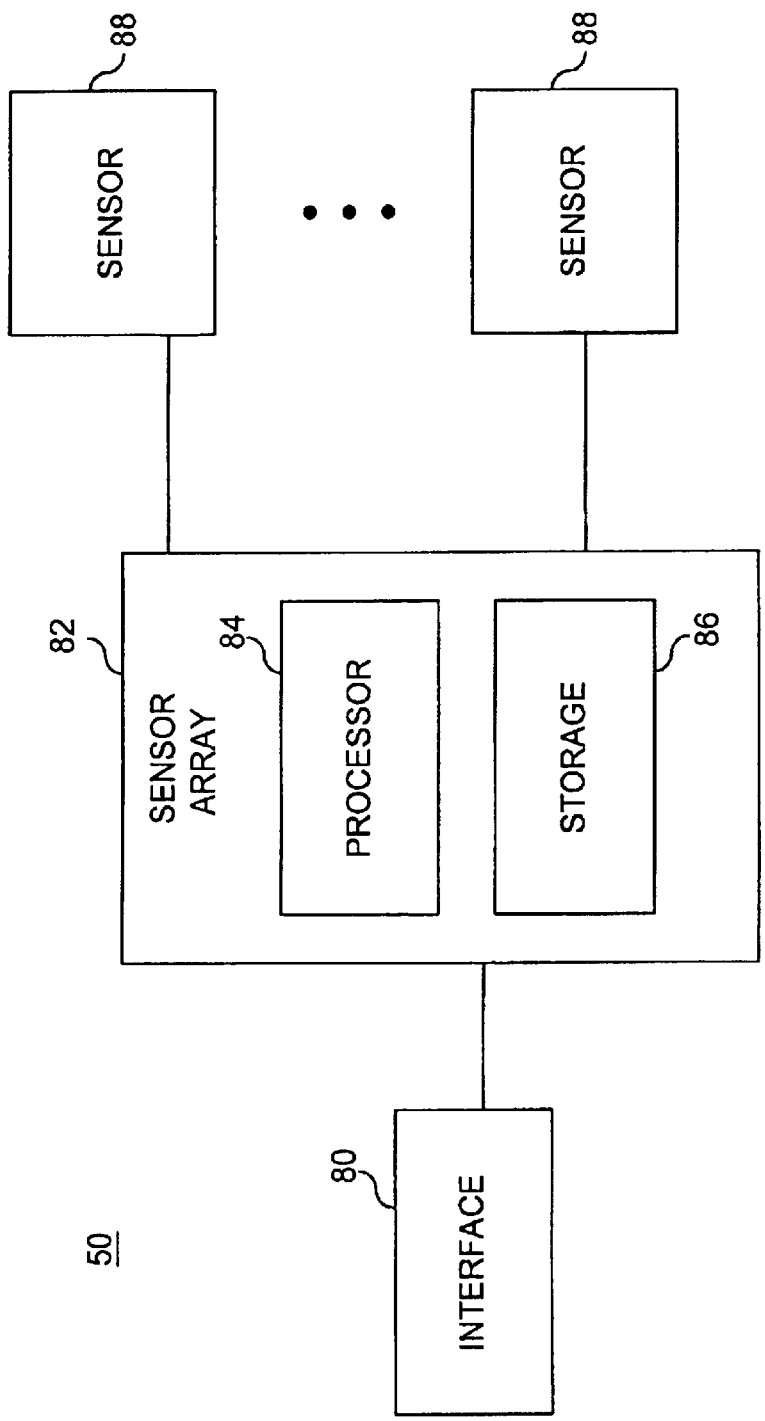
FIG. 4 is block diagram of biometric or multi-sensor module for implementing present invention.

Further, in this regard, as shown in FIG. 4 block diagram, biometric sensing device 50 having network interface 80, includes various sensors 88 for separately providing, preferably through analog-to-digital (A/D) converter circuit, to processor 84 and storage 86 of sensor array 82 disparate analog signals representing different measurable attributes regarding sensed object.

Preferably, sensor subsystem integration is achieved through microelectromechanical systems (MEMS) approach by providing, most if not all, electronic circuits including processor 84, storage 86, interface 80, sensors 88, and any A/D converter circuits on a common semiconductor substrate or die, although it may be more appropriate to provide interface 80 and sensors 88 on separate substrates or dice. In one embodiment, it is contemplated that multiple sensors may couple and provide mix-mode sensed signals to a common processing circuit.

For example, one or more such sensor modules may be implemented, at least in part, for functional operation according to present invention as described herein, using commercially available devices, such as product part number EDI 520 (smart sensor module), EDM 710 (sensor interface circuit), RS-485 (network node) from Electronics Development Corporation (Columbia, Md.).

In particular, preferably one set of one or more sensors 88 may sense and monitor one type of object condition, and another set of one or more sensors 88 may sense and monitor another type of object condition. For example, for a given individual subject being monitored, a first sensor set may monitor person temperature at one or more bodily sources, while a second sensor set may monitor same person perspiration rate at one or more bodily sources.

Hence, such multi-sensor set system serves to monitor related and/or possibly unrelated conditions associated with a common object or object set monitored during simultaneous, temporally close, or otherwise relatively proximate time periods. In accordance with one aspect of present invention, sensor array processing circuitry 82 operates to receive such multi-sensor signals which indicate sensed conditions representing different sensor or sensing signal types, classes, attributes, or other monitorable grouping, and thus process such effectively mix-mode signals to determine whether certain monitored object(s) or individual(s) previously, currently, or is likely to, fall within certain specified condition(s), as determined by processing such mix-mode sensor signals.

In this mix-mode approach, signal processing by processor 84 is performed in effectively combined and integrated manner according to one or more common rule set, user specification or other programmed instructions, which may classify and therefor indicate monitored object condition or sensed state logically or inferentially according to actual input sensed signal values corresponding to different modes or other physically measured grouping.

Hence, preferably, to achieve improved overall system or partial subsystem integration, processor 82, or functionally comparable digital signal processing circuit, serves separately to receive and process multiple-type sensor signals or signal sets, whereupon such sensor signals or signal sets represent different physically sensed or otherwise electronically monitorable conditions, state, attribute, modes, or quality of sensing thereof.

For example, processor 84 may locally execute instruction set in storage 86, to analyze, compare, correlate, or otherwise process received mix-mode signals according to specified rules or heuristics to indicate remotely whether subject individual may be diagnosed as having symptoms of one or more medical conditions, and therefore require dispensing of certain medicines or other goods or supplies. Such "smart sensor" processing and analysis may also be accomplished using digital signal processor having logically or functionally equivalent programming, or circuit configuration.

Thus, such intelligently determined conditions may be generated as more concise findings, flags, warnings, or other indications provided as feedback, preferably in digital packet, datagram, frame, or other capsulized format, through interface 80 for network access, for example, to serve as input values to simulator module 90 for fantasy gaming application, or communication module 94 for video-conferencing application. Optionally, interface 80 may provide sensor feedback data signal through network 10 according to one or more established or known network or bus interface standards, such as IEEE 1451 standard for interfacing to smart sensors.

Generally, such sensors 88 may be fixed, mobile, wirelessly-connected or wired, and separately sense temperature, pressure, physiological vital information (e.g., heart beat rate, blood pressure, etc.), or other biometric value. For example, one or more sensors in array 82 may be worn, implanted, attached, or provided by individual object on clothing or vehicle, or otherwise provided in contact thereto with one or more external or internal bodily locations.

In one embodiment, it is contemplated herein that such sensors 88 may be provided, for example, as one or more silicon-based micro-machined microstructure cavities which may be implanted for applicable modes such as neuro-electronic monitoring of cell metabolism and controlling of cell activity.

Also, such sensors 88 may be configured to monitor one or more voluntary and/or involuntary conditions, possibly considered herein as distinct sensory modes, of subject user or other observed party, such as skin temperature, perspiration rate, or other measurable physiological conditions. In particular, preferably, sensor array 88 operates in an intelligent or "smart" manner, such that, for example, distributed sensors, actively or passively, synchronously or asynchronously, sense and generate sensing signals according to pre-programmed logical rules or other user specifications, such as determining acceptable manufacturing tolerance or safety conditions.

In one embodiment of the present invention, sensor array 82 functions selectively or logically to screen, filter, censor, or otherwise exclude or enable access of representative signaling of certain sensed or otherwise observed conditions, optionally during specified times, dates, or other specified temporal segments, such as control of mature-audience programming. For example, within given monitoring period, processor 84 may compute or compare to determine, and accordingly indicate for network access, that received sense signals comply or violate certain specified range, or fall within particular margins. Optionally, processor 84 may selectively access one or more sensors 88 belonging to one or more selected mode, grouping, or other pre- or user-specified classification, such as higher-resolution, reliability, or quality sensor group Also, present distributed senor array architecture may provide for directed, hierarchical, self-navigating or organizing, adaptive, or otherwise flexibly programmable access to one or more sensors in array 82, such as by providing tiered quality of service access to varying level of sensor sensitivity, reliability, accuracy, performance, or other relevant sensor parameter.

For example, in a hierarchical-style embodiment of the present invention, a first set of mix-mode sensed signals are received for processing as described herein to generate a first processed signal indicating one monitored mode or other level of functional abstraction, which represents a logical determination according to rule-based interpretation or analysis of such first set of received for processing as well to generate a second processed signal indicating another monitored mode or other level of functional abstraction, which represents a different logical determination according to rule-based interpretation or analysis on such second set of received mix-mode signals.

Furthermore, such mix-mode first and second processed signals are received, in hierarchical or tiered fashion, for further processing according to rule-based interpretation or analysis as described herein to generate yet a third processed signal to serve as sensory feedback according to higher-level monitored mode or other level of functional abstraction.

Generally, according to specified rule set or other qualifying parameters, a digital signal is generated by processor or controller 84 to indicate one or more condition of the sensed object according to certain sensor input values. Additionally, referring further to FIGS. 5A and 5B, such multi-sensor scheme may be coupled to digital network 10 or otherwise coupled thereto for simulation and/or communication applications 90, 94, as described in more detail herein.

Referring to FIG. 3, initially, multi-sensor system, is configured 56 functionally with system components preferably as illustrated in FIG. 2, and source or object software, computer program, or other instruction code is installed 58 in such system for operation as described herein.

Optionally, one or more system users or corresponding clients 18, 20 subscribe 60 to, or are otherwise provided with, authorized user or group user accounts for secure system access, for example, as member for enabling exclusive access to one or more network-accessible programs, files, or other restricted objects. Authorization may be accomplished by identifiable user entry or other input through keyboard, mouse, voice, facial image recognition, finger print detection, retinal scan, smart card input, or other unique user entry, for example, by using peripheral device 26 as input processing device.

Optionally, authorization may be provided by user entry of unique password or other identifiable signature, such as genetic sequencing or other related data. Also, optionally, upon user authorization 60, authorized user may cause client 20 to conduct one or more comparison 62 of various objects available from a number of source nodes accessible through network 10.

For example, object compare 62 serves to enable user to conduct on-line product catalog shopping or otherwise select one or more desired objects using conventional network user interface, such as Internet browser application software. In this manner, user may specify 64 one or more objects for searching and subsequent comparison 62 thereof, until desired objects are found or otherwise identified for subsequent transaction. Furthermore, identifiable user entry for authorization purpose provides server source with tracking basis to bill or credit such user account for such service, as well as to monitor and otherwise record user usage history, behavior and preferences.

In one embodiment of present invention, server 12 or storage 16 may serve as network-accessible source for requesting, searching, renting, buying, and/or down-loading various software components, upgrades, or other code or data, such as text, graphics, audio, video, models, vectors, images, fantasy or sports games, instructions, commands, or other electronically transmittable messages or signals, which are sensed, user-selected or otherwise programmed or monitored according to present disclosure herein.

Hence, in this manner, such source server 12 or controller 22 may monitor usage or otherwise license distribution, usage or copying of such down-loaded software to certain target or requesting clients 20, 18. Additionally, in such code distribution scheme, network 10 serves effectively as real-time or interactive channel, architectural interface, or transaction platform for enabling secure subscription by multiple users or clients, particularly for providing multi-sensor related applications.

Moreover, optionally, user may define 66 one or more rules or other heuristic instruction sets according to one or more high-level functional or programming language or applications programming interface, which may be applied as attributes or conditions 68 to sensing scheme, as described herein. For example, applied attributes 68 may include user-selected object characteristics, mappable facial imaging features, or language translation dictionary, for processing simulated or communicated applications data.

Figure 5A:
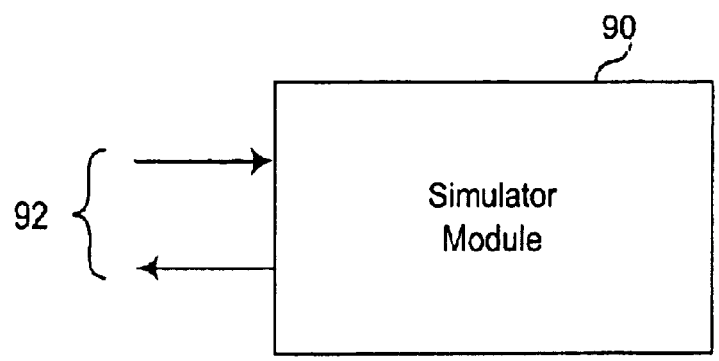
FIGS. 5A–B are simplified diagrams of simulator and communication modules respectively for implementing present invention.
Figure 5B:
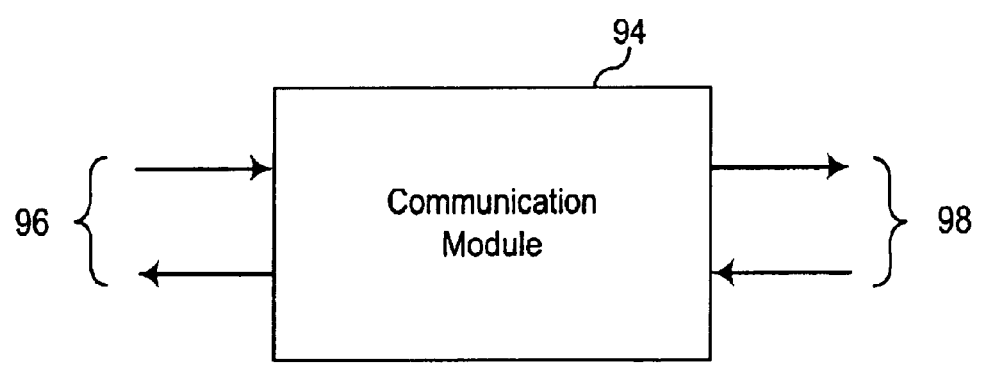

Preferably, multi-sensor functionality is implemented in the context of, or overlaid upon, simulation and/or communication 70, respectively using simulator module 90 and/or communication module 94, as shown in FIGS. 5A and 5B. In particular, such sensor functionality provides input/output sensed signals 92, 96, 98, whereupon certain sensor signals are generated 72 in response to detection and measurement of physical conditions or attributes.

Regarding deployment of simulator module 90, preferably client 20, 18 is provided with, or has access to, one or more software and/or hardware-based simulation or emulation program or functionality for representing the logic, behavior, functionality or other simulatable attribute of a modeled design, operation, condition, prototype, component, circuit, environment, or other computer-representable entity.

For example, simulator module 90 may include one or more commercially-available computer-implemented simulation program which operate using, at least in part, one or more simulation models. Thus, during simulation of such provided models, one or more input vectors, data or other signals are applicable thereto, such that the simulator may compute and thereby generate one or more proper output vectors, data or other signals responsively therefrom. Such output signals may cause one or more client output devices, such as audio device 46, mechanical device 48, display 32, dispenser device 52, to function accordingly or otherwise interact responsively with client use.

For example, simulator module 90 may be embodied to provide single or multi-user interactive gaming, therapy, and/or exercise functionality. In one embodiment, such simulation functionality operates in response to, among other things, multi-sensor input signals to enhance simulation experience, as generated according to present disclosure.

Regarding deployment of communication module 94, preferably client 20, 18 is provided with, or has access to, one or more software and/or hardware-based communications program, functionality, or other facility for transmitting and/or receiving communications signal for bi-directional or duplex signal interaction between a number of network-accessible processors or other nodes therein. For example, communication module 96 may be embodied in a video-conferencing system configured between two or more networked computers for effectively real-time exchange of images or live video between communicating client or peer parties. In one embodiment, such communication functionality operates by transmitting and/or receiving, among other things, multi-sensor signals to enhance communication experience, as generated according to present disclosure.

Furthermore, in accordance with such sensor response, communication and/or simulation modules 94, 90 and/or prior user specification may be modified, corrected, or otherwise changed. Optionally, from time to time, client software and other system parameters may be updated, such that client and/or system code may be remotely programmably upgraded or re-mapped 76.

Generally, present multi-sensor system is provided herein preferably for networked cooperation or feature overlay with simulator and/or video-conferencing application, whereupon, for example, conventional networked, interactive fantasy gaming program and/or video-conferencing system is enabled with effectively enhanced input or physical sensing of user or other object associated therewith.

Hence, in this overlaid approach, variously categorized sets of real-time sensory feedback collected, computed, and transmitted from smart sensor arrays provide additional advanced ways for improving networking and control, and thereby raise the level and quality of electronic communication and general user interactivity.

Foregoing described embodiments of the invention are provided as illustrations and descriptions. They are not intended to limit the invention to precise form or application described. In particular, Applicants contemplate that functional implementation of invention described herein may be implemented equivalently in hardware, software, firmware, and/or other available functional components or building blocks for various sensor-related commercial, industrial, medical, educational, media, broadcast, entertainment, food, agriculture, clothing, retail, fashion, defense, military, aerospace, automotive, transport, shipping, construction, design, finance, biotech, manufacturing, electronic, security, communications, information, or other related applications, systems or implementations.

Other variations and embodiments are possible in light of above teachings, and it is thus intended that the scope of invention not be limited by this Detailed Description, but rather by Claims following.

What is claimed is:

1. In a network comprising a plurality of interconnected nodes, a communication method comprising the steps of:

transmitting a video or image signal bi-directionally between a first node and a second node in a network with distributed sensor array architecture;

sensing a first signal associated with a first voluntary condition in the first node;

sensing a second signal associated with a second involuntary condition in the first node;

from the first node providing the second node a determination regarding the first node adaptively according to the first and second signals, wherein the first node comprises a plurality of adaptively accessible sensors for generating respectively the first and second signals;

sensing a third signal associated with a third voluntary condition in the second node;

sensing a fourth signal associated with a fourth involuntary condition in the second node; and from the second node providing the first node a second determination regarding the second node adaptively according to the third and fourth signals, whereby the second node comprises a plurality of adaptively accessible sensors for generating respectively the third and fourth signals.

2. The communication method of claim 1 wherein:

the first and second conditions correspond with independently measurable values, at least one such independently measurable value being accessible selectively in a sensor group providing a higher resolution or quality signal.

3. The communication method of claim 1 wherein:

the determination comprises a physiological state of a user associated with the first node, the physiological state being determined from a plurality of measurements detecting the user perspiration, temperature, and blood pressure or heart rate.

4. The communication method of claim 1 wherein:

the transmitted signal is modified in response to the determination, the transmitted signal comprising a modified online shopping catalog or message.

5. The communication method of claim 1 wherein:

the determination is provided according to user-specified or pre-programmed rule set, the rule set enabling a medical diagnosis for dispensing medication automatically, wherein usage of the rule set is remotely monitorable or licensable.

6. The communication method of claim 1 wherein:

the first signal is provided by a silicon-based microstructure having a cavity for sensing a cell condition, the microstructure being implemented in a programmable or self-organizing micro-electromechanical system in a semiconductor substrate implanted in a user.

7. The communication method of claim 1 wherein:

a network access is provided securely according to a user authorization or subscription, such authorization or subscription being secured biometrically using a genetic sequence of the user.

8. The communication method of claim 7 wherein:

the first signal is sensed through a network interface coupled thereto effectively to the first signal during a selected time segment or within a qualified sensor group according to a programmable instruction set which is executable by the interface, the network interface accessing one or more sensors directly, at least one of such sensors being accessed wirelessly in a mobile-vehicle.

9. A communication signal interface comprising:

a first signal path for transmitting a video or image signal effectively in duplex mode between a first node and a second node in a network with distributed sensor array architecture; and a second signal path for providing the second node from the first node a determination regarding the first node adaptively according to first and second signals, the first signal being associated synchronously with a first condition in the first node, and the second signal being associated asynchronously with a second condition in the first node, wherein the first node comprises a plurality of adaptively accessible sensors for generating respectively the first and second signals; the second signal path further provides the first node from the second node a second determination regarding the second node adaptively according to third and fourth signals, the third signal being associated synchronously with a third condition in the second node, and the fourth signal being associated asynchronously with a fourth condition in the second node, wherein the second node comprises a plurality of adaptively accessible sensors for generating respectively the third and fourth signals.

10. The communication signal interface of claim 9, wherein:

the first and second conditions correspond with independently measurable values, a plurality of such independently measurable values being accessible in a sensor group providing a higher resolution and quality signal.

11. The communication signal interface of claim 9 wherein:

the determination comprises a physiological state of a user associated with the first node, the physiological state being determined hierarchically from at least one measurement detecting the user perspiration, temperature, blood pressure or heart rate.

12. The communication signal interface of claim 9 wherein:

the transmitted signal is modified in response to the determination, the transmitted signal comprising a modified online shopping catalog or message for renting or buying an audio or video file.

13. The communication signal interface of claim 9 wherein:

the determination is provided according to user-specified or pre-programmed rule set, the rule set providing a medical diagnosis for dispensing medication interactively, wherein subscription of the rule set is monitorable or licensable effectively in real-time.

14. The communication signal interface of claim 9 wherein:

the first signal is provided by a silicon-based microstructure having a cavity for controlling a cell metabolism, the microstructure being implemented in a programmable or self-organizing micro-electromechanical system in one or more semiconductor substrate attached to a user.

15. The communication signal interface of claim 9 wherein:

a network access is provided securely according to a user authorization or subscription, such authorization or subscription being accomplished exclusively using an identifiable genetic sequence.

16. The communication signal interface of claim 9 wherein:

the first signal is sensed through a network interface coupled thereto effectively to the first signal during a selected time segment or within a qualified sensor group according to a programmable instruction set which is executable by the network interface, the network interface accessing a plurality of sensors, at least one of the accessed sensors being accessed bodily in a worn clothing.

17. A communication device comprising:

a network interface for communicating a video or image signal between a first node and a second node in a network with distributed sensor array architecture; and a processor for providing the second node from the first node a determination regarding the first node according to first and second signals, the first signal being associated with a first active condition in the first node, and the second signal being associated with a second passive condition in the first node, wherein the first node comprises a plurality of adaptively accessible sensors for generating respectively the first and second signals; the processor further provides the first node from the second node a second determination regarding the second node according to third and fourth signals, the third signal being associated with a third active condition in the second node, and the fourth signal being associated with a fourth passive condition in the second node, wherein the second node comprises a plurality of adaptively accessible sensors for generating respectively the third and fourth signals.

18. The communication device of claim 17 wherein:

the first and second conditions correspond with independently measurable values, a plurality of such independently measurable values being accessible hierarchically in a tiered sensor group providing a higher reliability signal.

19. The communication device of claim 17 wherein:

the determination comprises a physiological state of a user associated with the first node, the physiological state being determined using a self-navigating access to a measurement detecting the user perspiration, temperature, blood pressure or heart rate.

20. The communication device of claim 17 wherein:

the transmitted signal is modified in response to the determination, the transmitted signal comprising a modified online shopping catalog or message for requesting or downloading a game software.

21. The communication device of claim 17 wherein:

the determination is provided according to user-specified or pre-programmed rule set, the rule set detecting a user symptom for programmably dispensing a medical supply, wherein the application of the rule set is transacted with the user to dispense the medical supply.

22. The communication device of claim 17 wherein:

the first signal is provided by a silicon-based microstructure having a cavity for sensing a neuro-electronic activity, the microstructure being implemented in a programmable or flexibly organized micro-electromechanical sensor array attached externally to a user body.

23. The communication device of claim 17 wherein:

a network access is provided securely according to a user authorization or subscription.

24. The communication device of claim 17 wherein:

the first signal is sensed through a network interface coupled thereto effectively to the first signal during a selected time segment or within a qualified sensor group according to a programmable instruction set which is executable by the interface, the network interface providing a data feedback signal for accessing a plurality of sensors, at least one of the sensors being accessed during a video-conference between the first and second nodes.

* * * * *